United States Patent [19]

Smith

[11] Patent Number: 4,983,473
[45] Date of Patent: Jan. 8, 1991

[54] AUXILIARY POWER SOURCE WITH CHARGER AND INTEGRAL LIGHT SOURCE

[76] Inventor: James L. Smith, 3404 Cranbrook Dr., Fayetteville, N.C. 28301

[21] Appl. No.: 369,009

[22] Filed: Jun. 16, 1989

[51] Int. Cl.⁵ .................. H01M 6/00; H01M 2/26
[52] U.S. Cl. ........................ 429/48; 429/121; 429/123; 439/500; 439/501; 439/504
[58] Field of Search ........... 429/7, 65, 176, 121–123, 429/48; 439/500, 501, 504

[56] References Cited

U.S. PATENT DOCUMENTS

| | | |
|---|---|---|
| 691,144 | 1/1902 | Hutchison ............... 429/121 X |
| 2,551,990 | 5/1951 | Wills . |
| 2,701,332 | 2/1955 | Andre . |
| 3,337,695 | 8/1967 | Brown ................... 439/504 X |
| 3,456,181 | 7/1969 | Godshalk ............... 439/504 X |
| 3,689,322 | 9/1972 | Lindenberg et al. . |
| 3,776,778 | 12/1973 | Azuma et al. . |
| 4,161,682 | 7/1979 | Corvette ................ 439/504 X |
| 4,350,746 | 9/1982 | Chambers . |
| 4,634,642 | 1/1987 | Lopez-Doriga . |
| 4,636,447 | 1/1987 | Tate . |
| 4,653,833 | 3/1987 | Czubernat et al. ........ 439/501 X |

Primary Examiner—Stephen J. Kalafut
Attorney, Agent, or Firm—Robert G. Rosenthal

[57] ABSTRACT

A portable, lightweight, self-contained auxiliary power source for starting a motor vehicle, heavy equipment, power boat and the like having a defective starter battery is disclosed. The auxiliary power source includes a generally upright housing defining a chamber having a bottom section and a closable top section. A battery is provided that is adapted to be received within the chamber and includes a plurality of cells. The battery has a positive terminal and a negative terminal. A pair of cables are provided that have a proximal end and a distal end, each of the proximal ends include clamps being detachably connected to one of the respective terminals of the battery and the distal ends each include an alligator clamp for being detachably connected to the respective terminal of the defective battery. A light is connected to one of the alligator clamps for illuminating the work area.

6 Claims, 3 Drawing Sheets

AUXILIARY POWER SOURCE WITH CHARGER AND INTEGRAL LIGHT SOURCE

FIELD OF THE INVENTION

This invention relates generally to the field of auxiliary power sources and more particularly to auxiliary power sources that are light, compact, and which may be used to start various machines having defective starter batteries.

BACKGROUND OF THE INVENTION

It is well known to use an automobile battery to "jump start" another automobile having a defective battery due to discharge as a result of age, leaving headlights on when the vehicle is parked or for a variety of other reasons. Similarly, it is also well known to employ "jump cables" to transfer the electrical energy from the vehicle with an operational battery to the vehicle to be started. However, this method, in order to be effective, requires two vehicles and one set of jump cables (which may be difficult to locate).

Additionally, the aforementioned technique is further limited in that the starting of motor boats and heavy equipment may not be possible in all cases due to incompatabilities in voltage and/or difficulty in placing the charged battery within reach of the apparatus to be jump started.

While it is certainly possible to carry transport a spare 12-volt battery for use as needed, they tend to be bulky and heavy and, therefore, this method is not preferred. Similarly, transporting such a battery can be dangerous as it could flip over and leak acid. In addition, even if one were to carry an extra battery, a method of testing battery strength would still be needed to insure a charge when the need arose.

In another situation, such as a break down in a location where there are no street lights or where assistance is not available, one would further require a flashlight (which must also be in working order) to locate battery terminals, jump cables and a charged battery or, alternatively one would have to seek assistance from a third person. However, seeking assistance from an unknown person may not be advisable given the potential for criminal acts to occur.

In view of the foregoing, it is, therefore, an object of the present invention to provide a self-contained, portable, power source that includes everything needed to jump start a vehicle without assistance.

It is another object of the present invention to provide a portable power source that is relatively lightweight.

It is yet another object of the present invention to provide a portable power source With a Variety of output voltages.

It is still another object of the present invention to provide a portable power source that is rechargable.

It is still further object of the present invention to provide a power source that is usable without assistance and is safe.

SUMMARY OF THE INVENTION

To accomplish the object described above, there is provided a portable, lightweight, self-contained auxiliary power source for starting a motor vehicle, heavy equipment, power boat and the like having a defective starter battery. The auxiliary power source includes a generally upright housing defining a chamber having a bottom section and a closable top section. A battery is provided that is adapted to be received within the chamber and includes a plurality of cells. The battery has a positive terminal and a negative terminal. A pair of cable means are provided that have a proximal end and a distal end, each of the proximal ends include means for being detachably connected to one of the respective terminals of the defective battery.

BRIEF DESCRIPTION OF THE DRAWINGS

Some of the objects of the invention having been stated, other objects will appear as the description proceeds when taken in connection with the accompanying drawings in which.

DETAILED DESCRIPTION OF THE ILLUSTRATED EMBODIMENT

While the present invention will be described more fully hereinafter with reference to the accompanying drawings, in which a particular embodiment is shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1:
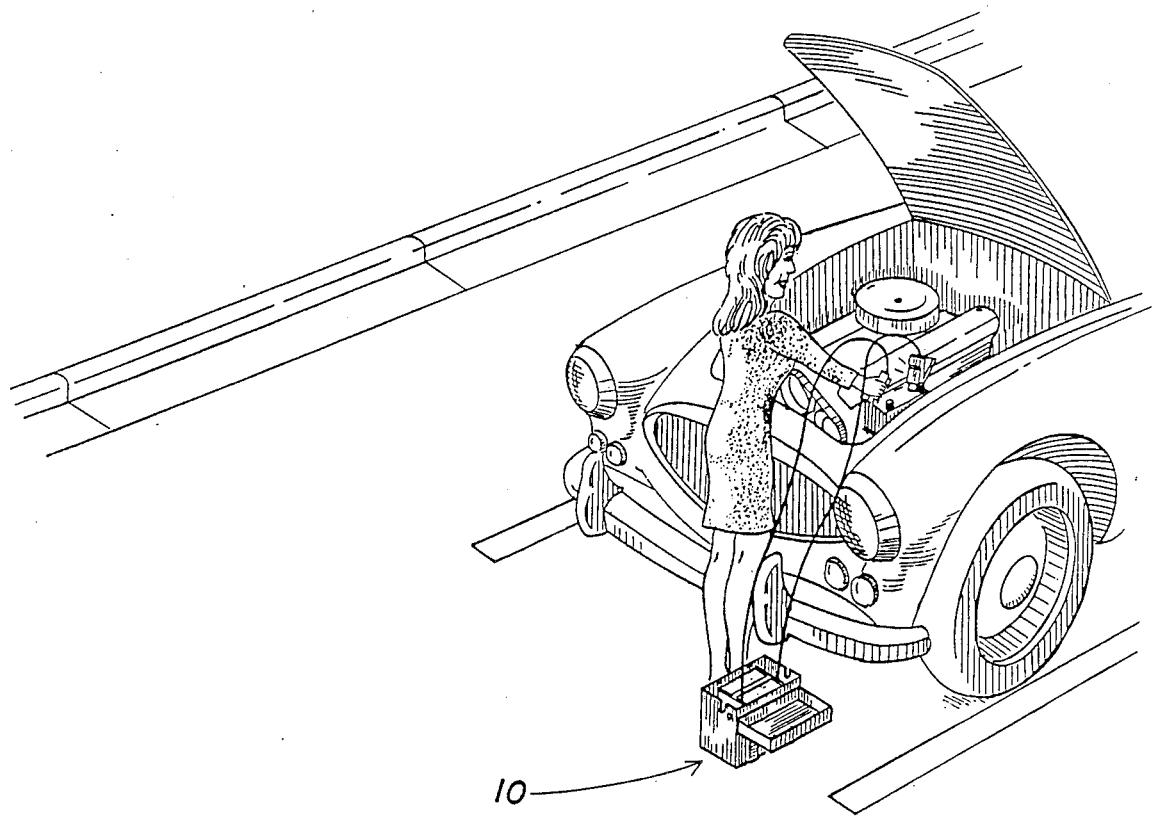
FIG. 1 is a perspective view of an automobile having a defective battery being connected to the auxiliary power source of the present invention prior to being jump started.

Referring more particularly to the drawings, an auxiliary power source which embodies the features of the invention is indicated generally at 10. The power source is adapted to assist in the jump starting of a motor vehicle, power boat, heavy equipment and the like such as shown in FIG. 1.

Figure 2:
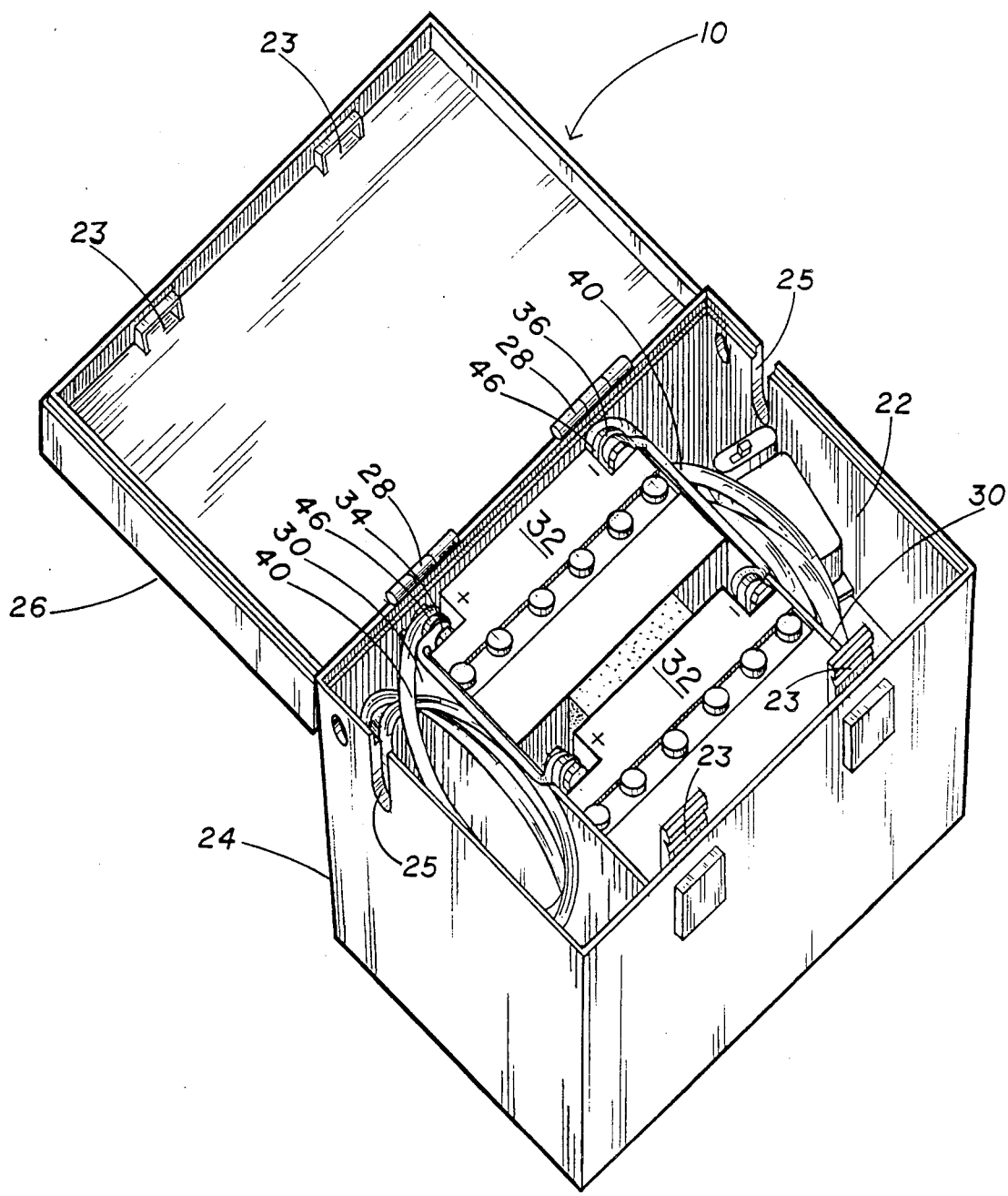
FIG. 2 is a perspective view of the auxiliary power source of the present invention stored in its carrying case.
Figure 3:
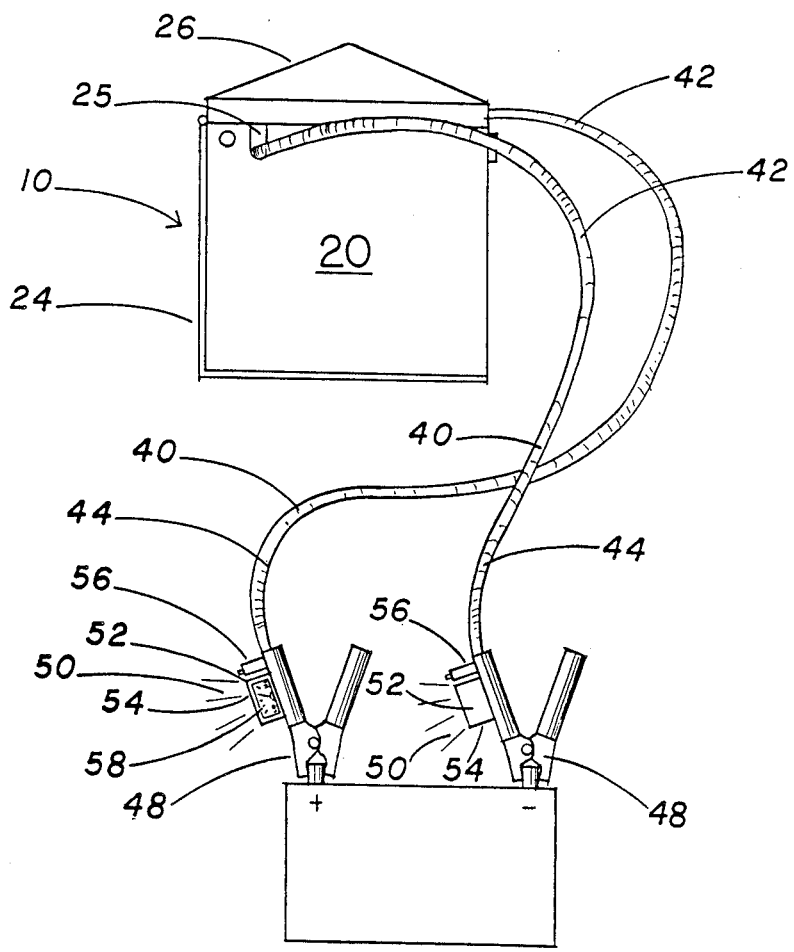
FIG. 3 is a perspective view of the auxiliary power source of the present invention with the cables removed from the carrying case and connected to a defective battery.
Figure 4:
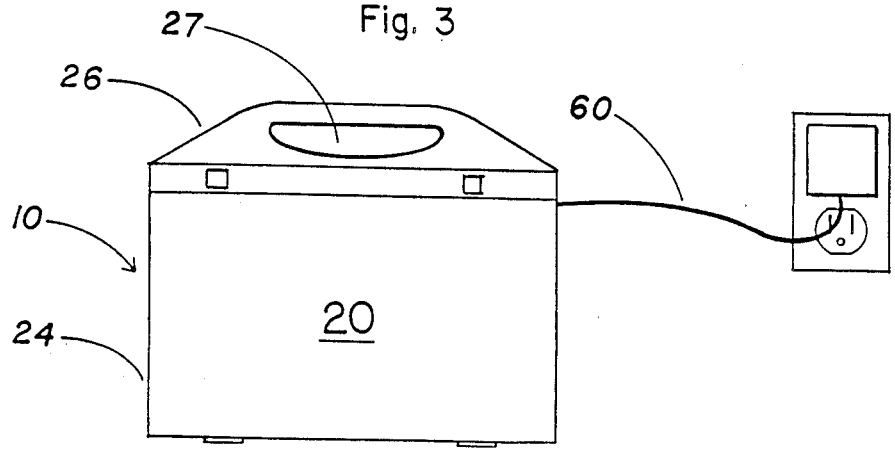
FIG. 4 is a perspective view of the auxiliary power source of the present invention being charged.

Referring now to FIGS. 2 through 4, the auxiliary power source is therein disclosed in detail. The auxiliary power source includes a generally upright housing 20 defining a chamber 22 and having a bottom section 24 and a closable top section 26 that are connected together by means of hinges 28. The top section 26 includes an integrally molded, contoured carrying handle 27. As illustrated, the bottom section 24 of the housing is divided into three subchambers or compartments by means of dividing walls 30 extending across the width of the chamber 22. The function of these subchambers will be explained in detail hereinbelow. The bottom section 24 includes a pair of cut out portions 25 of sufficient size to permit the battery cables to rest therein. This permits the cables to extend out from the housing while the top is closed, totally enclosing the battery thus providing a level of safety heretofore unavailable in devices of this type. A pair of latches 23 are also provided for keeping the housing 20 closed during transport and storage. The housing 20 may be manufactured from a lightweight, insulating, moldable plastic such as polypropelene o polyethelyene.

A battery means 32 of the type including a plurality of cells and having a positive terminal 34 and a negative or ground terminal 36 is also provided As shown in the figures, the battery means 32 takes the form of a pair of small, lightweight, 12-volt batteries, such as motorcycle batteries. As shown in FIG. 3, the batteries are placed in the center section of the bottom section 24 of the housing. By using two motorcycle batteries, instead of two standard automobile batteries, a 12 or 24-volt output can be delivered at a weight of approximately 18 pounds instead of 58 pounds.

A pair of cable means 40 are provided for transferring electrical energy from the battery. Each of the cables means 40 has a proximal end 42 and a distal end 44. Each proximal end 42 includes means 46 for being detachably connected to one of the battery terminals such as a clamp and each of the distal ends includes means 48 such as an alligator clamp for being detachably connected to one of the terminals of a defective battery. The cable means or cables 40 are of copper wire approximately thirty-six inches in length and are coated with an insulator The auxiliary power source 10 also includes a lighting means 50 connected proximate at least one of the clamps 48. As illustrated, the lighting means is connected directly to clamp 48 and comprises a light bulb 52 disposed within a housing 54 and includes wires connecting the bulb to the positive and negative battery terminals. An on/off switch 56 is also included in the power circuit. As will be seen, the light bulb 52 is oriented to illuminate the terminal post and its vicinity.

In addition, the apparatus may include a switch (not shown) for selecting either a twelve volt or a twenty four volt output. The switch will, therefore, connect the batteries in parallel for a twelve volt output or in series for a twenty-four volt output.

In another aspect of the invention, the auxiliary power source may also include a circuit for indicating the amount of electrical charge retained by the battery 58. A circuit of this type is well known and a detailed description thereof is not deemed necessary.

In addition, the auxiliary power source includes a battery charging set 60 for charging from a 110-volt or from a 12-volt power source. When charging from a 110-volt source (as shown in FIG. 4) it is necessary to convert the voltage to a 12-volt direct current. This may be accomplished by a transformer and rectifier circuit well known to those skilled in the art. Similarly, the power source may also be charged directly from another 12-volt source such as the cigarette lighter of the motor vehicle by using the appropriate adapter.

When the power source 10 is stored and is not in use, the batteries, cables, and charger are stored completely within the housing 20 with the top section 26 closed. In addition, it is important to note that the proximal ends 42 of the cables 40 are connected to the battery terminals, and that the distal ends 44 are each stored in one of the remaining compartments on opposite sides of the batteries. This prevents accidental contact of the clamps 48 and shorting out of the battery will not occur while the battery is in storage.

When it is desired to use the power source 10 it is placed in proximity to the defective battery. Then the top section 26 of the housing 20 is opened exposing the batteries 32 and the cables 40. The proper output voltage (12-volts or 24- volts) is then selected and the clamps 48 are then connected to the terminals of the battery to be charged. The vehicle is then started, the cables are disconnected and placed back in the housing 20 and the top section 26 is closed. If necessary, the lighting means may be switched on and off as needed.

Throughout the foregoing disclosure, the term "automobile" and "vehicle" have been used. It is intended that this limitation is for purposes of illustration only and that the invention may be applied with equal efficacy to snowmobiles, power boats, lawnmowers and any other type of machines with a battery operated starter.

The foregoing embodiments and examples are to be considered illustrative, rather than restrictive of the invention, and those modifications which come within the meaning and range of equivalence of the claims are to be included therein.

That which is claimed is:

1. A portable, lightweight, auxiliary power source for starting a motor vehicle, heavy equipment, or power boat, like having a defective starter battery and comprising:
   a generally upright housing defining a chamber and having a bottom section and a closable top section;
   a battery means adapted to be received within said chamber, said battery means including a plurality of voltage cells and having a positive terminal and a negative terminal;
   a pair of cable means, each of said cable means having a proximal end and a distal end, each of said proximal ends including means for being detachably connected to one of said respective terminals, and each of said distal ends including means for being detachably connected to one of the respective terminals of a defective battery,
   said battery means and said cable means being completely storable within said housing when not in use.

2. An apparatus according to claim 1 wherein said housing includes separate chambers for each of said cable means for preventing accidental discharge of said battery means.

3. An apparatus according to claim 1 wherein said means for detachably connecting the distal ends of said cable means to the terminal posts comprises a conducting clamp.

4. An apparatus according to claim 1 wherein said means for detachably connecting the distal ends of said cable means to the terminal posts further includes lighting means connected proximate thereto and adapted to illuminate said terminal posts 5. An apparatus according to claim 3 wherein said power source further includes a charge indicator means operatively associated with said battery means for indicating the amount of energy stored in said battery.

6. A portable lightweight auxiliary power source for starting a motor vehicle, heavy equipment, or power boats having a defective starter battery and comprising:
   a generally upright housing having a bottom section and a closable top section and defining a chamber, the bottom section of said housing being further divided into three separate chambers;
   a pair of cable means, each of said cable means having a proximal end and a distal end, each of said proximal ends including means for being detachably connected to one of said respective terminals, and each of said distal ends including means for being detachably connected to one of the respective terminal posts of a defective battery;

said battery and said cable means being completely storable within said housing with the top section of said housing being closed and with the proximal ends of said cable means being connected to said terminals, with one of the distal ends of said cable means being stored in a separate chamber for preventing accidental discharge of said battery;

a lighting means connected to the means for detachably connecting the distal end of said cable means to said battery and being powered by said battery.

* * * * *